(12) United States Patent
Fujita et al.

(10) Patent No.: US 7,787,235 B2
(45) Date of Patent: Aug. 31, 2010

(54) SOLID ELECTROLYTIC CAPACITOR AND METHOD FOR MANUFACTURING THE SAME

(75) Inventors: Masayuki Fujita, Kyoto (JP); Takashi Umemoto, Hirakata (JP); Hiroshi Nonoue, Hirakata (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 276 days.

(21) Appl. No.: 12/099,855

(22) Filed: Apr. 9, 2008

(65) Prior Publication Data

US 2008/0259528 A1  Oct. 23, 2008

(30) Foreign Application Priority Data

Apr. 20, 2007  (JP)  .............................. 2007-111725

(51) Int. Cl.
*H01G 9/04*  (2006.01)
*H01G 9/145*  (2006.01)
*H01G 4/228*  (2006.01)
*H01G 9/10*  (2006.01)
*H05K 5/03*  (2006.01)

(52) U.S. Cl. ........................ 361/528; 361/538; 29/25.03

(58) Field of Classification Search ................. 361/528, 361/538, 533, 532, 531, 540, 523, 524, 525; 29/25.03
See application file for complete search history.

(56) References Cited

U.S. PATENT DOCUMENTS 6,989,289 B1 * 1/2006 Shiraishi et al. ............... 438/99
7,388,741 B2 * 6/2008 Konuma et al. ............. 361/528

FOREIGN PATENT DOCUMENTS

| JP | 05283298 A | * | 10/1993 |
| JP | 11-274008 A1 | | 10/1999 |
| JP | 2003-136142 A1 | | 5/2003 |

* cited by examiner

*Primary Examiner*—Eric Thomas
*Assistant Examiner*—David M Sinclair
(74) *Attorney, Agent, or Firm*—Marvin A. Motsenbocker; Mots Law, PLLC

(57) ABSTRACT

Provided is a solid electrolytic capacitor with a high capacity occurrence rate and a high capacity and a method for manufacturing the solid electrolytic capacitor. An anode body is formed on a periphery of an anode lead having a hollow structure. The anode body has a porous body of a valve metal or an alloy of the metal as its main component. The hollow structure allows an inside and an outside of the anode body to connect with each other. A dielectric layer is formed on a surface of the anode body, and a conducting polymer layer is formed on a surface of the dielectric layer. When the conducting polymer layer is formed, the inside of the anode body is depressurized by suction from the outside of the anode body through the hollow structure of the anode lead.

18 Claims, 3 Drawing Sheets

PRIOR ART

SOLID ELECTROLYTIC CAPACITOR AND METHOD FOR MANUFACTURING THE SAME

CROSS REFERENCE TO RELATED APPLICATIONS

This application claims priority based on 35 USC 119 from prior Japanese Patent Application No. P2007-111725 filed on Apr. 20, 2007, the entire contents of which are incorporated herein by reference.

BACKGROUND OF THE INVENTION

1. Field of the Invention

The present invention relates to a solid electrolytic capacitor and a method for manufacturing the same.

2. Description of Related Art

With the development of high-performance portable appliances such as mobile telephones and portable music players, capacitors with a smaller size and a higher capacity have been demanded by the market.

As such small-sized and high-capacity capacitor, a solid electrolytic capacitor using a valve metal, such as tantalum (Ta) or aluminum (Al), has been a focus of attention. The solid electrolytic capacitor of this type is manufactured in the following manner. Firstly, a binder formed of a resin and an organic solvent is added to and mixed and kneaded with fine powder of a metal, such as tantalum, or an alloy of the metal. Then, one end of an anode lead is buried in the mixture. The mixture with the buried anode lead is pressed and heated at a high temperature in vacuo to be sintered. Thereby, an anode body formed of a sintered body is formed. Subsequently, the obtained sintered body (anode body) is anodized to form a dielectric oxide film on a surface of the sintered body. Thereafter, a solid electrolyte layer formed of manganese dioxide or a conducting polymer, such as polypyrrole and polyaniline, is formed. Furthermore, a graphite layer and a silver layer are sequentially formed on the solid electrolyte layer. Thereby, a capacitor element is completed.

A method for increasing the capacity of such solid electrolytic capacitor is to increase a surface area of the sintered body to be used as an anode body. A method for increasing the surface area of the sintered body is to reduce the particle size of the metal or the alloy of the metal to be used for sintering.

However, when the particle size of the metal or the alloy of the metal to be used for sintering is reduced, it becomes difficult to form the conducting polymer film, which is formed on the surface of the anode body and is a porous body, in a deep portion inside the anode body. Accordingly, a cathode cannot be formed in a deep portion inside the anode body, and thus a capacity occurrence rate is decreased. As a result, a required capacity cannot be obtained.

To solve the above-described problem, Japanese Patent Application Laid-Open Publication No. Hei 11-274008 discloses a method in which depressurization is carried out when an anode body is soaked in a solution for forming a conducting polymer film.

However, such method has a problem in that the manufacturing process becomes complicated because an anode body has to be disposed in a depressurization chamber when the anode body is soaked in the solution. In addition, even if such method is used, the capacity occurrence rate cannot be sufficiently increased. Accordingly a high capacity cannot be obtained.

Japanese Patent Application Laid-Open Publication No. 2003-136142 discloses a pipe-shaped metal body capacitor and a method for manufacturing the same.

SUMMARY OF THE INVENTION

An aspect of the invention provides a solid electrolytic capacitor that comprises: an anode lead; an anode body formed of porous material, connected with one end of the anode lead; a dielectric layer provided on a surface of the anode body; and a conducting polymer layer provided on a surface of the dielectric layer, wherein the anode lead has a hollow structure, and the hollow structure connects an inside to an outside of the anode body.

In the above-described solid electrolytic capacitor, the anode lead having a hollow structure is used and the inside and the outside of the anode body communicate with each other via the anode lead. Thus, when a material for forming the conducting polymer layer is introduced to the inside of the anode body, the inside of the anode body is sucked in from the outside of the anode body through the hollow structure of the anode lead so as to depressurize the inside of the anode body. Thereby, the material can be introduced into a deep portion inside the anode body. Thus, the conducting polymer layer can be formed in a deep portion inside the abode body, and a cathode can form in a vicinity of the center portion of the anode body. Accordingly, a capacitor occurrence rate can be increased and a high capacity can be obtained.

In addition, with the solid electrolytic capacitor, even when the particle size of the fine powder of the metal or the alloy of the metal for forming the anode body is reduced, the cathode can be formed in the deep portion inside the anode body. Thus, a metal or alloy fine powder of small particle size can be used, so that the surface area of the anode body can be increased. Accordingly, also from such a viewpoint, the solid electrolytic capacitor with a high capacity occurrence rate and a high capacity can be obtained.

In an embodiment, the anode lead may have a branching portion with multiple branches inside the anode body. Provision of the branching portion allows suction from multiple tip ends through the hollow structure and the inside of the anode body can be depressurized from multiple portions inside the anode body. Thereby, the material for forming the conducting polymer layer can be more evenly introduced into the inside of the anode body. In addition, by using the anode lead with the branching portion, the anode lead becomes difficult to separate from the anode body.

Also, the anode lead may have a curved portion inside the anode body. The shape of the curved portion may be bowed or bent. In addition, the shape may be zigzag. By using such anode lead having the curved portion inside the anode body, the anode lead is prevented from separating from the anode body.

Moreover, it is preferable that holes, each reaching the hollow structure of the anode lead form in the end portion and/or side wall portion of the anode lead. By forming multiple holes as described above, the positions of the holes that allow suction of the inside of the anode body can be dispersed. With the above-described configuration, the depressurization of the inside of the anode body can be made more even. This allows the material to be evenly introduced into the inside of the anode body.

Furthermore, since uneven portions are present in the side wall portion of the anode lead due to the multiple holes formed therein, adhesive strength between the anode body and the anode lead is improved. Thus, the anode lead becomes more difficult to separate from the anode body.

In addition, by forming holes in the side wall portion of the above-described branching portion or curved portion, suction holes can be dispersedly throughout the inside of the anode body.

In addition, it is preferable that the anode lead be provided in the center portion of the anode body. By providing the anode lead so as to be positioned in the center portion of the anode body, suction can be carried out in the center of the anode body, and the sucked material can infiltrate towards the center portion of the anode body.

Another aspect of the invention provides a method for manufacturing a solid electrolytic capacitor that comprises: forming an anode body on a periphery of an anode lead having a hollow structure, the anode body formed of porous material, and the hollow structure allowing an inside and an outside of the anode body to connect with each other; forming a dielectric layer on a surface of the anode body; and forming a conducting polymer layer on a surface of the dielectric layer, wherein when the conducting polymer layer is formed, the inside of the anode body is depressurized by suction from the outside of the anode body through the hollow structure of the anode lead.

With the above-described manufacturing method, the inside of the anode body is depressurized by suction from the outside of the anode body through the hollow structure of the anode lead when the material for forming the conducting polymer layer is introduced into the inside of the anode body. Thereby, the material can be introduced into the inside of the anode body. Accordingly, the material can be introduced into a deep portion inside the anode body, and thus a cathode can be formed even in a deep portion inside the anode body. Thus, with the above-described manufacturing method, a high capacity occurrence rate can be achieved, and accordingly a solid electrolytic capacitor with a high capacity can be manufactured.

In an embodiment, the anode lead has a hollow structure, and for example, a pipe-shaped anode lead may be used. As such pipe-shaped anode lead, a pipe-shaped metal body disclosed in Japanese Patent Application Laid-Open Publication No. 2003-136142 may be used. In addition, as described above, the anode lead may have a branching portion or a curved portion. In addition, it is preferable to use an anode lead with holes, each being formed in the end portion and/or a side wall portion of the anode lead and reaching the hollow portion inside thereof.

In addition, as is similar to the anode body, it is preferable that the anode lead be formed of a valve metal or an alloy of the metal. By using the anode lead formed of the valve metal or alloy of the metal, the capacity of the capacitor can be increased.

Also, the anode body is formed of a porous body of the valve metal or alloy of the metal. Such valve metal is not particularly limited as long as it can be used for a solid electrolytic capacitor. For example, it includes niobium, tantalum, titanium, aluminum, hafnium, zirconium, zinc, tungsten, bismuth, antimony, or the like. Of these metals, it is preferable to use niobium, tantalum, and titanium which have high conductivity and whose raw materials can be easily obtained. In particular, it is preferable to use niobium because niobium has approximately 1.5 times higher conductivity than that of tantalum. As the valve action alloy, an alloy of at least one valve metal, such as niobium and tantalum, is preferably used. In addition, if an alloy of a valve metal and a metal without valve action is used, it is preferable that the valve metal contain a weight percentage of 50 or more. In addition, it is particularly preferable that the valve metal or alloy of the metal for forming an anode be niobium or alloy having niobium as a main component thereof (that is, alloy containing niobium with a weight percentage of 50 or more).

The fine powder of the valve metal or alloy of the metal is used to form a molded body. Then, the molded body is heated to be high temperature and then sintered. Thereby, the molded body can be a porous body.

In an embodiment, the dielectric layer can be formed by oxidizing the surface of the anode body manufactured as described above by the anodizing process or the like.

In an embodiment, the conducting polymer layer can be formed from a conducting polymer, such as polypyrrole or polythiophene. In addition, as the polymerization method of the conducting polymer, a chemical polymerization method or an electrolytic polymerization method can be used.

When such conducting polymer layer is formed, the inside of the anode body is depressurized by suction from the outside of the anode body through the hollow structure of the anode lead. Thereby, the material for forming the conducting polymer layer can be introduced into the inside of the anode body by depressurizing the inside of the anode body.

The material for forming the conducting polymer layer includes a solution containing a monomer to be a conducting polymer, a solution containing the monomer and an oxidant for polymerization, or the like. In addition, if the conducting polymer layer is formed by the gas-phase oxidation polymerization, the material may be vapor containing the monomer. In addition, if the conducting polymer layer is polymerized by bringing the vapor containing the monomer into contact with the surface on which an oxidant adheres, the material for forming the conducting polymer layer also includes a solution containing an oxidant for causing the oxidant to adhere on the dielectric layer.

After the conducting polymer layer is formed, as is similar to a general solid electrolytic capacitor, a carbon layer and a silver paste layer are formed thereon. The carbon layer can be formed by applying a carbon paste, while the silver paste layer can be formed by applying a silver paste.

As described above, a solid electrolytic capacitor with a high capacity occurrence rate and a high capacity can be provided.

DETAILED DESCRIPTION OF EMBODIMENTS

Figure 1:
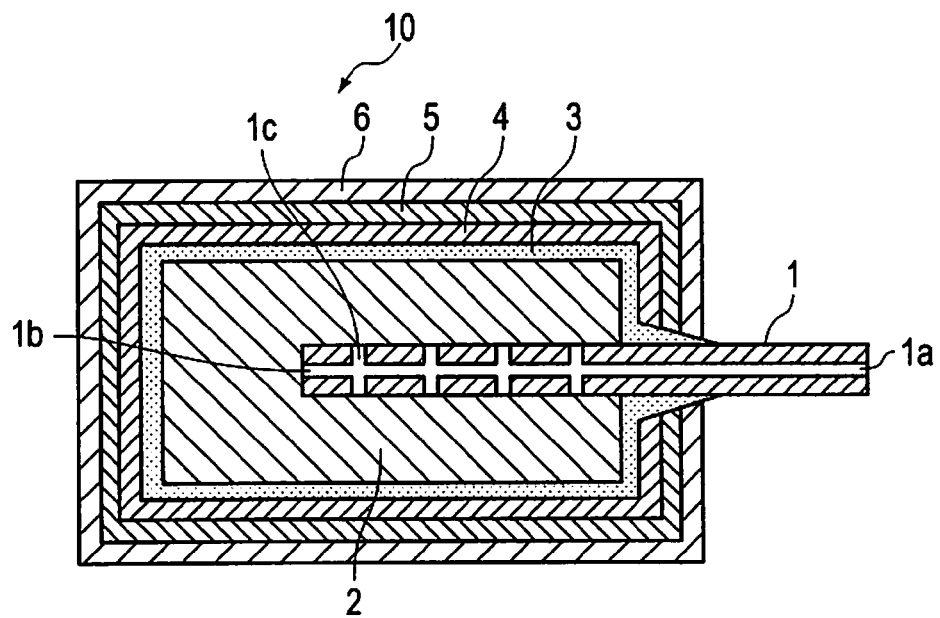
FIG. 1 is a schematic configurational cross-section showing a capacitor element of a first embodiment.

Embodiments of the present invention will be described by referring to the drawings. In the description of the drawings of the embodiments, same or similar reference numerals may be given to denote the same or similar portions.

Prepositions, such as "on", "over" and "above" may be defined with respect to a surface, for example a layer surface, regardless of that surface's orientation in space. Preposition "above" may be used in the specification and claims even if a layer is in contact with another layer. Preposition "on" may be used in the specification and claims when a layer is not in contact with another layer, for example, there is an intervening layer between them.

First Embodiment

A niobium powder with a CV value of 100,000 µFV/g is used as a raw material. The niobium is mixed with a binder to prepare a mixed niobium powder. A tantalum plate with a thickness of 0.1 mm is cut to a predetermined size. Then, as disclosed in Japanese Patent Application Laid-Open Publication No. 2003-136142, by using multiple semi-circular metal molds, the cut tantalum plated is pressed into a halved tube shape, and a joint thereof is welded. In this manner, a pipe-shaped tantalum wire with an outer diameter of 0.5 mm and an inner diameter of 0.3 nm is prepared. Multiple holes, each having a drill diameter of 0.05 mm, are formed in a portion to 2 mm from a tip end of the wire, so as to reach a hollow portion of the wire. Specifically, the holes are formed in eight portions in total. Four of which are formed in different portions in the wire length direction of a part of the wire to be buried in an anode body, while the other four are correspondingly formed on the opposite sides on which the former four holes are formed.

The above-described mixed niobium powder is molded into a size of 4.5 mm×3.3 mm×1.0 mm by using a metal mold. Note that the mixed niobium is molded in such a manner that the tip end of the anode wire in which the holes are formed is buried in the molded body. The binder in the molded body obtained as described above is removed under depressurization. After that, the binder-removed molded body is heated to sinter at 1100° C. Thereby, a niobium anode body is prepared. The niobium anode body is a porous body and has fine pores even in the inside thereof.

A surface of the niobium anode body prepared as described above is oxidized by the anodizing process to form a dielectric layer thereon. Specifically, the niobium anode body is soaked in a phosphoric acid solution, the weight percentage of which is approximately 0.1 and the temperature of which is maintained at approximately 60° C. Then, a voltage of approximately 10 V is applied to the phosphoric acid solution for 10 hours. Thereby, a dielectric layer is formed. After the formation of the dielectric layer, the anode body is soaked in sulfuric acid with a weight percentage of 30 to measure capacitance. Table 1 shows measurement results of the capacitance at this time as submerged capacities.

Next, a polypyrrole film is formed on the dielectric layer of the anode body as a conducting polymer layer. The polypyrrole layer is formed by the gas-phase oxidation polymerization or liquid-phase oxidation polymerization. The gas-phase oxidation polymerization is carried out in the following manner. That is, the anode body is first soaked in a solution containing an oxidant, causing the oxidant to adhere on the dielectric layer of the anode body. Thereafter, by evaporating a monomer of polypyrrole, oxidation polymerization of the monomer is carried out by using the oxidant adhered to the anode body. As for the liquid-phase oxidation polymerization, the oxidant is similarly adhered to the anode body. Thereafter, the anode body is soaked in a solution containing a monomer of polypyrrole, and the oxidation polymerization of the monomer is carried out to form a polypyrrole film.

When the polypyrrole film is formed by the above-described gas-phase oxidation polymerization or liquid-phase oxidation polymerization, the inside of the anode body is sucked through an anode lead, which has a hollow structure and is inserted into the anode body. Thereby, the inside of the anode body is depressurized. The suction amount is set to be 20 ml/minute per element, and the suction is carried out until air inside the anode body soaked in the solution disappears (until bubbles disappear). Specifically, the suction is carried out when the anode body is soaked in the solution containing the oxidant in the gas-phase oxidation polymerization and when the anode body is soaked in the solution containing the monomer of polypyrrole in the liquid-phase oxidation polymerization. In addition, after the anode body is soaked in the solution containing the oxidant, such suction is carried out when the oxidation polymerization of the monomer is performed by the oxidant adhered to the anode body by evaporating the monomer of polypyrrole.

After the polypyrrole film is formed as a conducting polymer layer as described above, a carbon layer and a silver layer are formed on the conducting polymer layer. Thereby, a capacitor element is prepared.

FIG. 1 is a schematic configurational cross-section showing the prepared capacitor element. As shown in FIG. 1, a pipe-shaped anode wire is used as anode lead 1. One end of anode lead 1 is buried inside anode body 2. In the tip end of anode lead 1, hole 1b is formed. In the side wall portion of the tip end buried in anode body 2, multiple holes 1c are formed. In addition, hole 1a is formed in the tip end on the other end of the anode lead. Thereby, an inside and outside of anode body 2 are in communication with each other through anode lead 1.

Anode body 2 is formed on a periphery of one end of anode lead 1, and is a porous body with fine holes inside. Dielectric layer 3 is formed on a surface of the anode body. Although it is unillustrated in FIG. 1, the inside of anode body 2 is a porous body formed of porous material, and dielectric layer 3 is also formed on a surface of the porous body inside of anode body 2. Conducting polymer layer 4 is formed on dielectric layer 3. The conducting polymer layer 4 is formed of the polypyrrole film by the gas-phase oxidation polymerization and liquid-phase oxidation polymerization as described above. As is similar to dielectric layer 3, conducting polymer layer 4 is also formed on the surface inside the anode body.

Carbon layer 5 is formed on conducting polymer layer 4 on the outer periphery of the anode body. Carbon layer 5 is formed by applying a carbon paste, and is not formed inside the anode body but formed only on conducting polymer layer 4 on the surface of the outer periphery of the anode body. Silver layer 6 is formed on carbon layer 5 by applying a silver paste layer. Thus, a cathode includes conducting polymer layer 4, carbon layer 5, and silver layer 6.

As shown in FIG. 1, anode lead 1 in the present embodiment is formed of a wire having a hollow structure. Accordingly, when anode body 2 is soaked in a solution for forming conducting polymer layer 4, the inside of anode body 2 can be depressurized by suction from hole 1a of anode lead 1, which is positioned outside of anode body 2. Thereby, the solution can be infiltrated into a deep portion inside anode body 2. In addition, by sucking vapor for forming conducting polymer layer 4 from hole 1a of the anode lead positioned outside of anode body 2 when the vapor is introduced into the inside of anode body 2, the vapor also can infiltrate into a deep portion inside anode body 2. Since holes 1b are also formed on the side wall portion of the one end of anode lead 1, the inside of anode body 2 can be depressurized from multiple portions. Thus, the solution and vapor into the inside of anode body 2 can be evenly infiltrated in the entire anode body.

A metal terminal plate is mounted on each of anode lead 1 and silver layer 6 of capacitor element 10 prepared as described above. Then, capacitor element 10 and the metal terminal plate are coated with a resin by injection molding to prepare a solid electrolytic capacitor. A hundred of the solid electrolytic capacitors are prepared to measure a capacity of each solid electrolytic capacitor by using an LCR meter with a frequency of 120 Hz. Table 1 shows a mean value of measurements as a mean capacity. Note that a relative value is also shown on table 1 as a relative capacity by setting a mean capacity of a first comparative example to be 1. In addition, table 1 also shows a capacity occurrence rate to be calculated by the following formula.

Capacity occurrence rate (%)=(Mean capacity ($C_M$)/ Submerged capacity ($C_A$))×100

Second Embodiment

As an anode lead, an anode wire having a hollow structure similar to that of the first embodiment is prepared. In the anode wire, holes are formed in one end to be buried in an anode body by using a drill, and multiple holes each with a diameter of 0.05 mm are also formed in the other end that is not buried in the anode body. Specifically, the holes are formed in eight portions in total in a part of the wire to be buried in the anode body. Four of these holes are formed in different portions in the wire length direction, while the other four are correspondingly formed on the opposite sides in which the four former holes are formed. At the same time, the holes are similarly formed in four portions in total in a part that is not buried in anode body 2. Two of these holes are formed in different portions in the wire length direction, while the other two are correspondingly formed on the opposite side in which the former two holes are formed (that is, twelve holes in total). Besides the foregoing description, a capacitor element is prepared similarly to the first embodiment.

Figure 2:
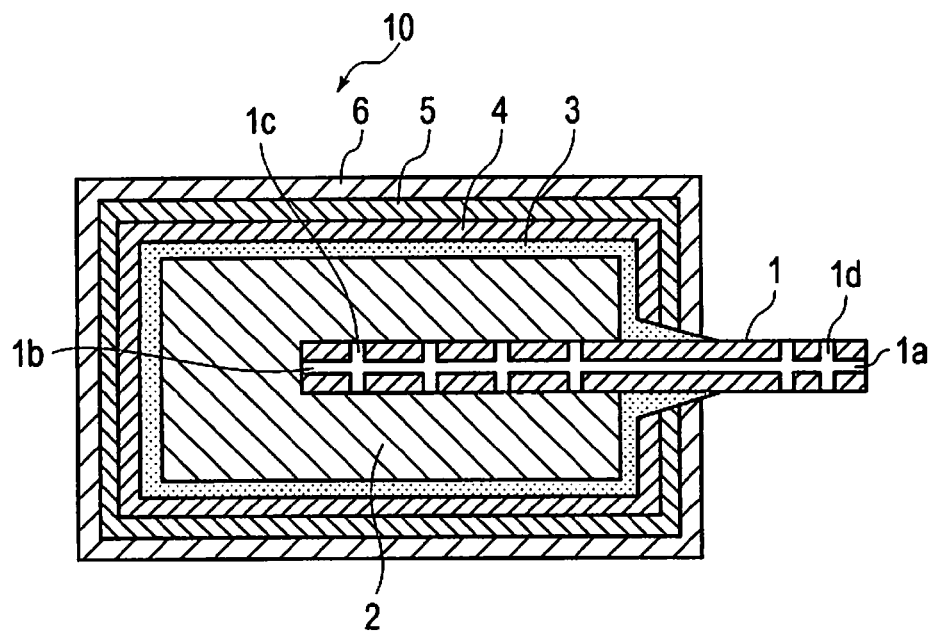
FIG. 2 is a schematic configurational cross-section showing a capacitor element of a second embodiment.

FIG. 2 is a schematic configurational cross-section showing the prepared capacitor element. As shown in FIG. 2, in the present embodiment, holes 1$d$ are also formed in a side wall portion of a part of anode lead 1 which protrudes to the outside of anode body 2. When conducting polymer layer 4 is formed, suction is carried out from holes 1$a$ and 1$d$ formed in the outside of anode body 2, to depressurize the inside of anode body 2. The suction amount is set to 30 ml/minute per element.

Similar to the first embodiment, a hundred of solid electrolytic capacitors are prepared by using the above-described capacitor elements, to calculate a mean capacitor thereof. Table 1 shows a submerged capacity of the capacitor element, a mean capacity, a relative capacity, and a capacity occurrence rate, of the electrolytic capacitor.

Third Embodiment

As is similar to the first embodiment, a tantalum plate with a thickness of 0.1 mm is cut to a predetermined size. Then, the cut plate is pressed and welded to prepare a pipe-shaped wire with an outer diameter of 0.5 mm and an inner diameter of 0.3 mm. In addition, a tantalum plate with a thickness of 0.05 mm is cut to a predetermined size. The cut plate is pressed and welded by using another metal mold to prepare three pipe-shaped wires, each having an outer diameter of 0.2 mm and an inner diameter of 0.1 mm. These three pipes are mounted, by welding, on an end portion of a hollow wire with the outer diameter of 0.5 mm. Accordingly, what is prepared is an anode lead which has a branching portion at which the wire with the outer diameter of 0.5 mm to be branched into three wires, each having the outer diameter of 0.2 mm. Besides using the anode lead having the branching point, a capacitor element is formed similarly to the first embodiment.

Figure 3:
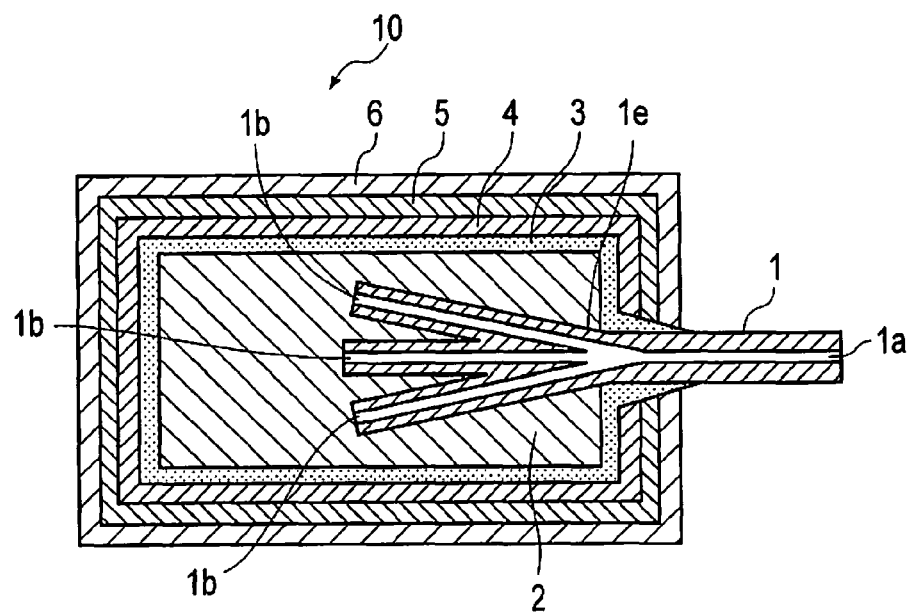
FIG. 3 is a schematic configurational cross-section showing a capacitor element of a third embodiment.

FIG. 3 is a schematic configurational cross-section showing the prepared capacitor element. As shown in FIG. 3, branching portion 1$e$ of anode lead 1 is formed so as to be disposed inside anode body 2. Hole 1$b$ is formed in each of the tip ends of the three pipes extending from the branching point 1$e$. These holes 1$b$ are in communication with hole 1$a$ on the other end positioned outside anode body 2.

Like the first embodiment, solid electrolytic capacitors are prepared, using the above-described capacitor elements, and a submerged capacity, a mean capacity, a relative capacity, and a capacity occurrence rate are calculated. Table 1 shows these results.

Fourth Embodiment

A tantalum plate with a thickness of 0.07 mm is cut to a predetermined size. Then, the cut plate is pressed and welded by using a metal mold to form a pipe-shaped wire with an outer diameter of 0.5 mm and an inner diameter of 0.2 mm. Holes, each having a diameter of 0.05 mm, are formed in a tip end of the pipe-shaped wire by using a drill. Specifically, the holes are formed in six portions in total in a part of the wire to be buried in the anode body. Three of these holes are formed in different portions in the wire length direction, and the other three are correspondingly formed on the opposite sides in which the former three holes are formed. The tip end of the pipe-shaped wire is held by pincers and bent while being heated by a gas burner. Then, a ring-shaped portion with a diameter of approximately 1 mm is formed so that the holes formed earlier by the drill would be disposed in the outside and inside of the ring-shaped portion. Besides using the pipe-shaped wire forming the ring-shaped portion (curved portion) as the anode lead, a capacitor element is formed similarly to the first embodiment.

Figure 4:
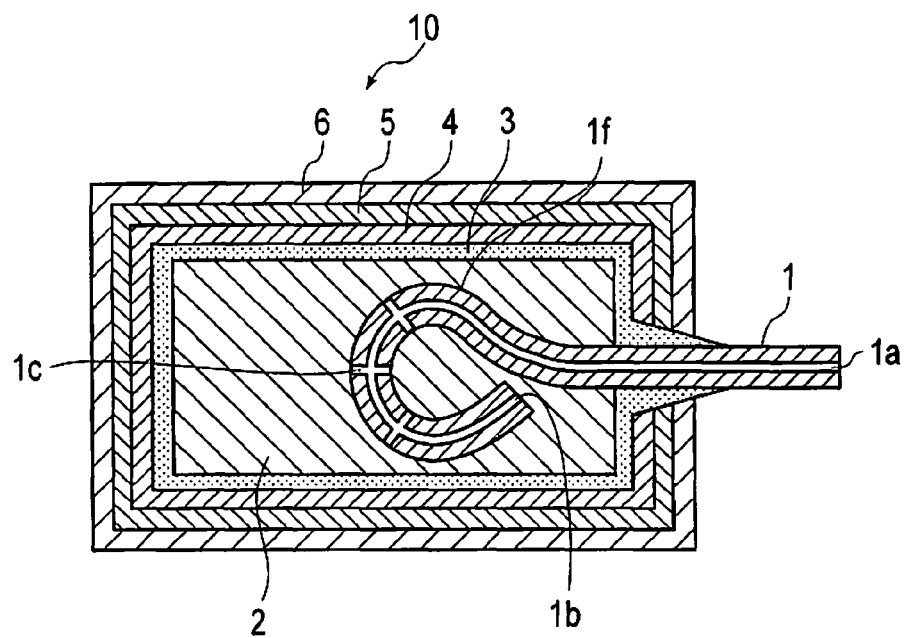
FIG. 4 is a schematic configurational cross-section showing a capacitor element of a fourth embodiment.

FIG. 4 is a schematic configurational cross-section showing the prepared capacitor element. As shown in FIG. 4, anode lead 1 is disposed so that curved portion 1$f$ would be positioned inside anode body 2. Holes 1$c$ are formed in multiple positions in curved portion 1$f$. As is similar to the first embodiment, solid electrolytic capacitors are prepared by using the capacitor element, and a submerged capacity, a mean capacity, a relative capacity, and a capacity occurrence rate were calculated. Table 1 shows these results.

First Comparative Example

A stick-shaped tantalum wire with a diameter of 0.5 mm is used as an anode lead to prepare a capacitor element as in the case of the first embodiment. However, in the process of forming a conducting polymer layer, a pipe-shaped wire is not used as anode lead 1. Thus, the inside of anode body 2 is not depressurized.

Figure 5:
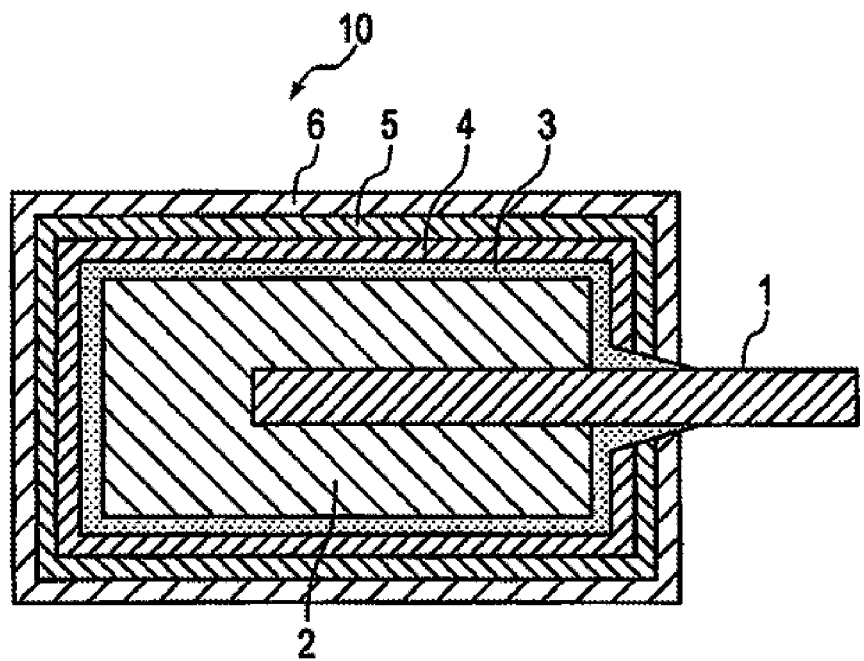
FIG. 5 is a schematic configurational cross-section showing a capacitor element of a first comparative example.

FIG. 5 is a schematic configurational cross-section showing the prepared capacitor element. As shown in FIG. 5, as anode lead 1, a stick-shaped tantalum wire is used. As is similar to the first embodiment, a hundred solid electrolytic capacitors are prepared by using the above-described capacitor elements, and a submerged capacity, a mean capacitor, a relative capacity, a capacity occurrence rate are calculated. Table 1 shows these results.

Second Comparative Example

As in the case of the first comparative example, a tantalum wire with a diameter of 0.5 mm is used as an anode lead. In the present comparative example, when a conducting polymer layer is formed, the process of soaking an anode body in a solution is carried out in a reaction chamber having a closed exhaust system by depressurizing the inside of the chamber to a pressure of 0.2 atmospheres (where the atmospheric pressure is 0.8 atmospheres). Besides the foregoing description, a capacitor element is prepared similarly to the first embodiment.

A hundred solid electrolytic capacitors are prepared by using the prepared capacitor elements, and a submerged capacity, a mean capacity, a relative capacity, and a capacity occurrence rate are calculated. Table 1 shows these results.

TABLE 1

|  | Mean Capacity $C_M$ (μF) | Relative Capacity (Relative to First Comparative Example) | Submerged Capacity $C_A$ (μF) | Capacity Occurrence Rate $C_M/C_A$ (%) |
|---|---|---|---|---|
| First Embodiment | 335 | 1.38 | 434 | 77 |
| Second Embodiment | 354 | 1.46 | 434 | 82 |
| Third Embodiment | 297 | 1.22 | 394 | 75 |
| Fourth Embodiment | 290 | 1.19 | 412 | 70 |
| First Comparative Example | 243 | 1.00 | 430 | 57 |
| Second Comparative Example | 265 | 1.09 | 430 | 62 |

As shown on Table 1, the mean capacities of the first to fourth embodiments are higher than those of the first and second comparative examples. In addition, the capacity occurrence rates of the first to fourth embodiments are also higher than those of the first and second comparative examples. Accordingly, with the above-described embodiments, a solid electrolytic capacitor with a high capacity occurrence rate and high capacity can be achieved.

In addition, comparison is made between the numbers of the anode leads missed from the anode bodies in the manufacturing processes in the first embodiment and in the first comparative example. In the first comparative example, 10 out of 1000 anode leads are missed from anode bodies during the entire processes. That is, these 10 anode leads have become defective. In contract, in the first embodiment, there is no defective piece. In addition, there is no defective piece in the second, third, and fourth embodiments. This is likely because the anode lead is formed to have the hollow structure, so that the adhesiveness of the anode body and the anode lead is increased. In addition, in the third and fourth embodiments, as shown in FIGS. 3 and 4, the anode lead has the branching portion or curved portion inside the anode body. Thus, it is less likely that the anode lead is missed from the anode body.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

What is claimed is:

1. A solid electrolytic capacitor comprising:
   an anode lead;
   an anode body formed of porous material connected with one end of the anode lead;
   a dielectric layer provided on a surface of the anode body; and
   a conducting polymer layer provided on a surface of the dielectric layer, wherein
   the anode lead has a hollow structure, and the hollow structure connects an inside of the anode body to an outside of the anode body.

2. The solid electrolytic capacitor of claim 1, wherein the anode body is formed essentially of a valve metal.

3. The solid electrolytic capacitor of claim 1, wherein the anode body is formed essentially of an alloy of a valve metal.

4. The solid electrolytic capacitor of claim 1, wherein the anode lead has a branch structure inside of the anode body.

5. The solid electrolytic capacitor of claim 1, wherein the anode lead branches inside of the anode body, and each of the branches has a hollow structure to allow the inside and the outside of the anode body to connect with each other.

6. The solid electrolytic capacitor of claim 1, wherein the anode lead has a curved portion inside of the anode body.

7. The solid electrolytic capacitor of claim 1, wherein a hole reaching the hollow structure of the anode lead is formed in an end of the anode lead.

8. The solid electrolytic capacitor of claim 1, wherein a hole reaching the hollow structure of the anode lead is formed in a side wall portion of the anode lead.

9. The solid electrolytic capacitor of claim 1, wherein the anode lead is provided in a center portion of the anode body.

10. A method for manufacturing a solid electrolytic capacitor, comprising the steps of:
    forming an anode body on a periphery of an anode lead having a hollow structure, the anode body formed of porous material, and the hollow structure allowing an inside of the anode body and an outside of the anode body to connect with each other;
    forming a dielectric layer on a surface of the anode body; and
    forming a conducting polymer layer on a surface of the dielectric layer, wherein
    when the conducting polymer layer is formed, the inside of the anode body is depressurized by suction from the outside of the anode body through the hollow structure of the anode lead.

11. The method of claim 10, wherein the anode body is formed essentially of a valve metal.

12. The method of claim 10, wherein the anode body is formed essentially of an alloy of a valve metal.

13. The method of claim 10, wherein the anode lead has a structure in which the anode lead branches inside of the anode body.

14. The method of claim 10, wherein the anode lead branches inside of the anode body, and each of the branches has a hollow structure to allow the inside and the outside of the anode body to be communicated with each other.

15. The method of claim 10, wherein the anode lead has a curved portion inside of the anode body.

16. The method of claim 10, wherein a hole reaching the hollow structure of the anode lead is formed in an end of the anode lead.

17. The method of claim 10, wherein a hole reaching the hollow structure of the anode lead is formed in a side wall portion of the anode lead.

18. The method of claim 10, wherein the anode lead is provided in a center portion of the anode body.

* * * * *